US 12,050,210 B2

(12) United States Patent
Nogami et al.

(10) Patent No.: US 12,050,210 B2
(45) Date of Patent: Jul. 30, 2024

(54) ANALYSIS APPARATUS COLUMN OVEN

(71) Applicant: Hitachi High-Tech Corporation, Tokyo (JP)

(72) Inventors: Makoto Nogami, Tokyo (JP); Yusuke Shimizu, Tokyo (JP); Daisuke Akieda, Tokyo (JP); Kenichiro Nishiki, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 422 days.

(21) Appl. No.: 17/433,119

(22) PCT Filed: Feb. 27, 2020

(86) PCT No.: PCT/JP2020/008165
§ 371 (c)(1),
(2) Date: Aug. 23, 2021

(87) PCT Pub. No.: WO2020/175651
PCT Pub. Date: Sep. 3, 2020

(65) Prior Publication Data
US 2022/0155266 A1    May 19, 2022

(30) Foreign Application Priority Data
Feb. 27, 2019   (JP) ................. 2019-034845

(51) Int. Cl.
*G01N 30/54*    (2006.01)
*B01D 15/16*    (2006.01)
(Continued)

(52) U.S. Cl.
CPC ............. *G01N 30/54* (2013.01); *G01N 30/30* (2013.01); *G01N 30/6047* (2013.01);
(Continued)

(58) Field of Classification Search
CPC .................. B01D 15/161; B01D 15/22; G01N 2030/3084; G01N 2030/8881;
(Continued)

(56) References Cited

U.S. PATENT DOCUMENTS 5,983,710 A * 11/1999 Uhen .................... G01N 30/30
73/23.25
2007/0084982 A1* 4/2007 Martone ............ G01N 30/6047
248/316.8
(Continued)

FOREIGN PATENT DOCUMENTS

JP         62-145150 U      9/1987
JP         H04194749 A  *   7/1992   ......... G01N 30/6091
(Continued)

OTHER PUBLICATIONS

Machine Translation of WO-2017199335-A1 (Year: 2023).*
(Continued)

*Primary Examiner* — David L Singer
(74) *Attorney, Agent, or Firm* — Crowell & Moring LLP

(57) ABSTRACT

An analysis apparatus column oven equipped with a plurality of columns is capable of efficiently performing heat conduction on column basis, recognizing a column cartridge that holds a column, and being easily exchanged on column basis. The column change mechanism includes a ferrule, a movable ferrule connector, a pipe, a fastener pull, a fastener fitting, a column cartridge presser, a slide guide, an RFID reader, a fixed wall, a column changer heat insulating member, a fixed bottom plate, a receiver, and a fixed fitting. A plurality of column cartridges can be installed in the heat block, and are in contact with the column heat block to control the temperature in the column cartridges. The column cartridge is fixed between left and right column change mechanisms, and when the fixed column cartridge is opened,
(Continued)

the column change mechanism on the left side is moved leftward and opened.

7 Claims, 16 Drawing Sheets

(51) Int. Cl.
  *G01N 30/30* (2006.01)
  *G01N 30/60* (2006.01)
(52) U.S. Cl.
  CPC ....... *G01N 30/6091* (2013.01); *B01D 15/161* (2013.01); *G01N 2030/3084* (2013.01)
(58) Field of Classification Search
  CPC .... G01N 30/30; G01N 30/54; G01N 30/6004; G01N 30/6047; G01N 30/6091
  See application file for complete search history.

(56) References Cited

U.S. PATENT DOCUMENTS

| | | | |
|---|---|---|---|
| 2010/0154207 A1* | 6/2010 | Ford | G01N 30/6004 29/700 |
| 2011/0290233 A1 | 12/2011 | Iso et al. | |
| 2012/0160690 A1 | 6/2012 | Jarrell et al. | |
| 2013/0052083 A1* | 2/2013 | Kirby | F24H 1/142 392/465 |
| 2013/0206653 A1* | 8/2013 | Brann | B01L 3/545 210/198.2 |
| 2014/0150536 A1* | 6/2014 | Shreve | G01N 30/54 73/61.57 |
| 2014/0290491 A1* | 10/2014 | Kanai | G01N 30/6052 96/101 |
| 2015/0209787 A1* | 7/2015 | Brann | F16L 37/20 29/469 |
| 2015/0285414 A1* | 10/2015 | Tomida | F16L 19/065 285/389 |
| 2015/0323509 A1* | 11/2015 | Kirby | B01D 15/10 29/280 |
| 2016/0103103 A1* | 4/2016 | Yotani | G01N 30/606 73/61.53 |
| 2016/0363564 A1 | 12/2016 | Kirby et al. | |
| 2017/0038345 A1 | 2/2017 | Shreve et al. | |
| 2019/0033271 A1* | 1/2019 | Sabolis | G01N 30/6047 |
| 2020/0025727 A1 | 1/2020 | Hasegawa et al. | |
| 2020/0150100 A1* | 5/2020 | Lerner | G01N 30/6047 |
| 2020/0386723 A1* | 12/2020 | Gamache | G01N 30/6091 |

FOREIGN PATENT DOCUMENTS

| | | | | |
|---|---|---|---|---|
| JP | 2000-111536 A | | 4/2000 | |
| JP | 3776446 B1 | * | 5/2006 | ............ G01N 30/60 |
| JP | 2007-527015 A | | 9/2007 | |
| JP | 2011-252719 A | | 12/2011 | |
| JP | 2013-517511 A | | 5/2013 | |
| JP | 2014-521983 A | | 8/2014 | |
| JP | 6194310 B2 | | 9/2017 | |
| WO | WO 2005/092467 A1 | | 10/2005 | |
| WO | WO 2011/091030 A1 | | 7/2011 | |
| WO | WO 2012/058515 A2 | | 5/2012 | |
| WO | WO 2013/028450 A1 | | 2/2013 | |
| WO | WO 2017/199335 A1 | | 11/2017 | |
| WO | WO-2018173214 A1 | * | 9/2018 | ............ G01N 30/60 |
| WO | WO-2019133887 A1 | * | 7/2019 | ......... G01N 30/6034 |

OTHER PUBLICATIONS

Machine Translation of JP-2000111536-A (Year: 2023).*
Japanese language only Written Opinion (PCT/ISA/237) issued in PCT Application No. PCT/JP2020/008165 dated Apr. 21, 2020 (five (5) pages) (Year: 2020).*
International Preliminary Report on Patentability (PCT/IB/338 & PCT/IPEA/409) issued in PCT Application No. PCT/JP2020/008165 dated Sep. 2, 2021 (five (5) pages).
International Search Report (PCT/ISA/210) issued in PCT Application No. PCT/JP2020/008165 dated Apr. 21, 2020 with English translation (six (6) pages).
Extended European Search Report issued in European Application No. 20762207.7 dated Nov. 2, 2022 (nine (9) pages).

* cited by examiner

[FIG. 1]
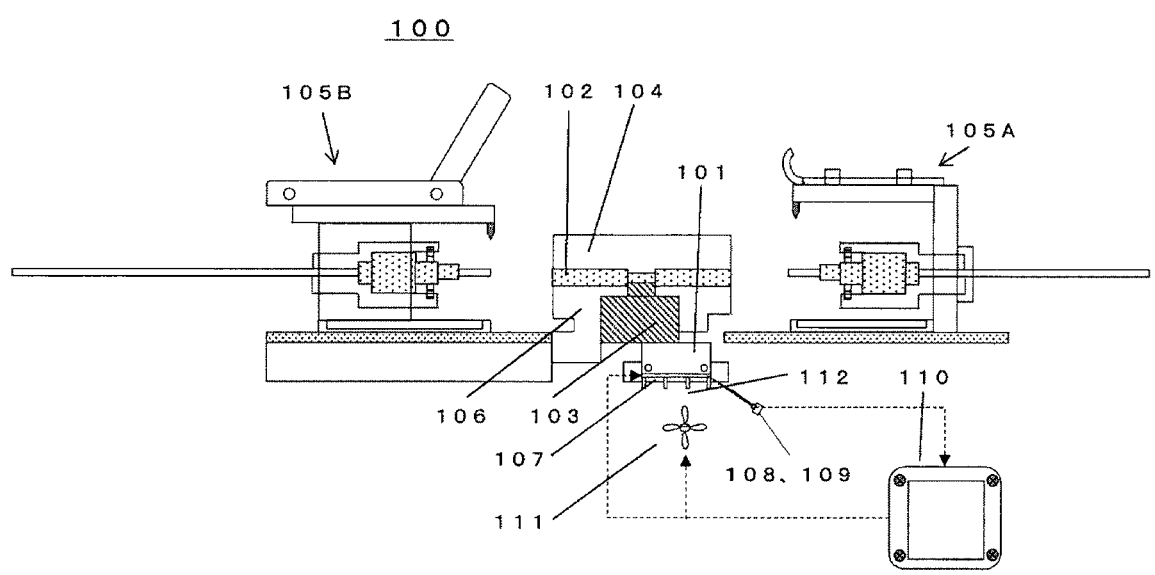

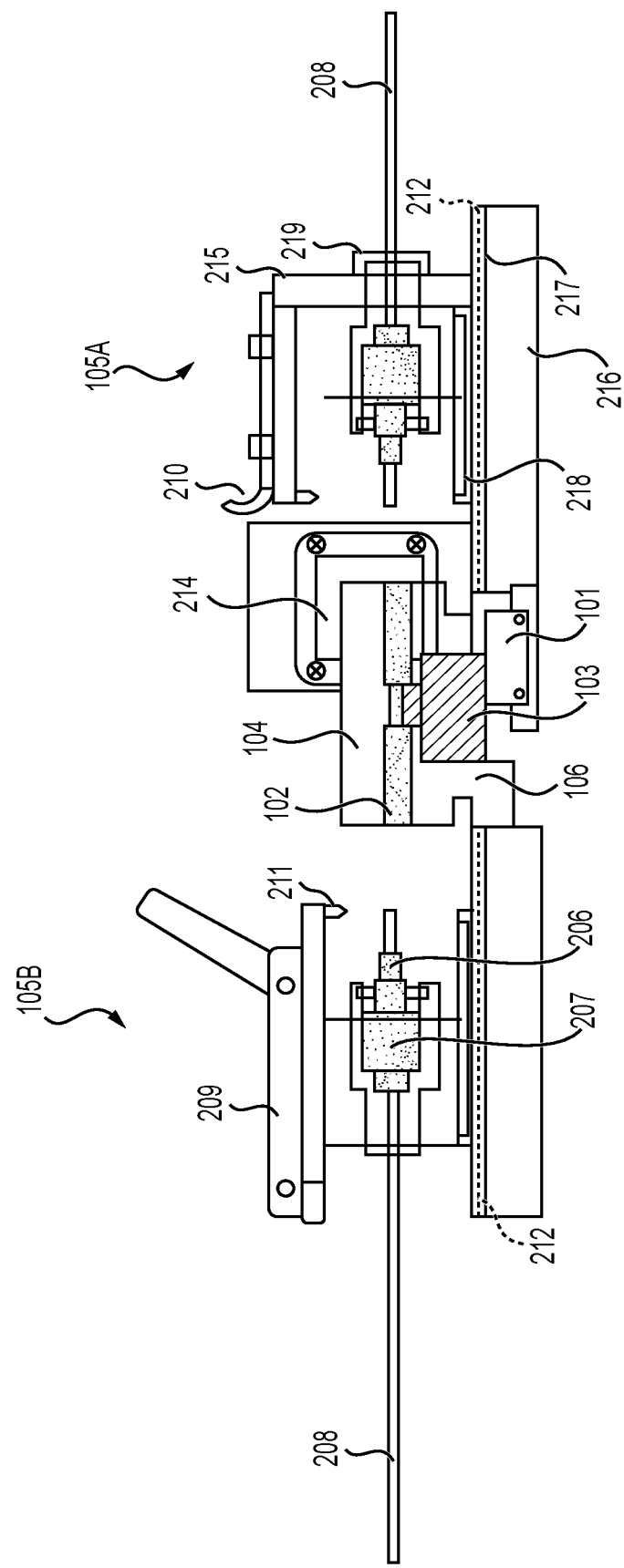
[FIG. 2]

[FIG. 3]
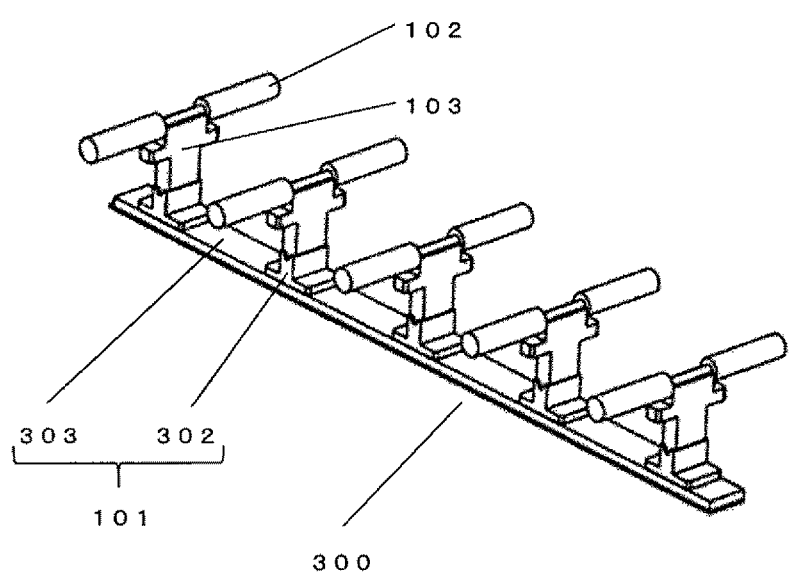

[FIG. 4A]
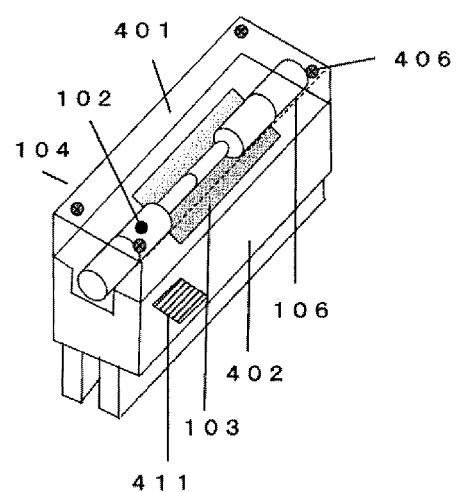

[FIG. 4B]
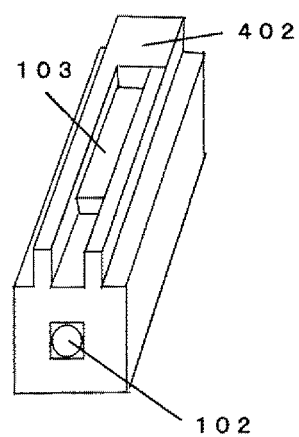

[FIG. 4C]
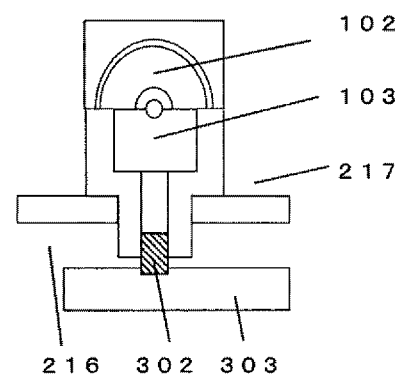

[FIG. 5]
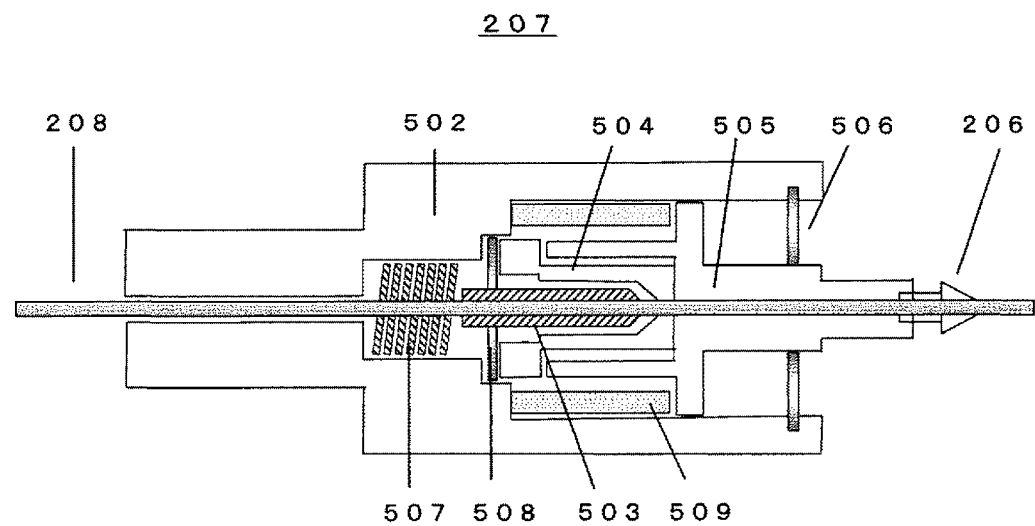

1) INITIAL STATE
[FIG. 6A]
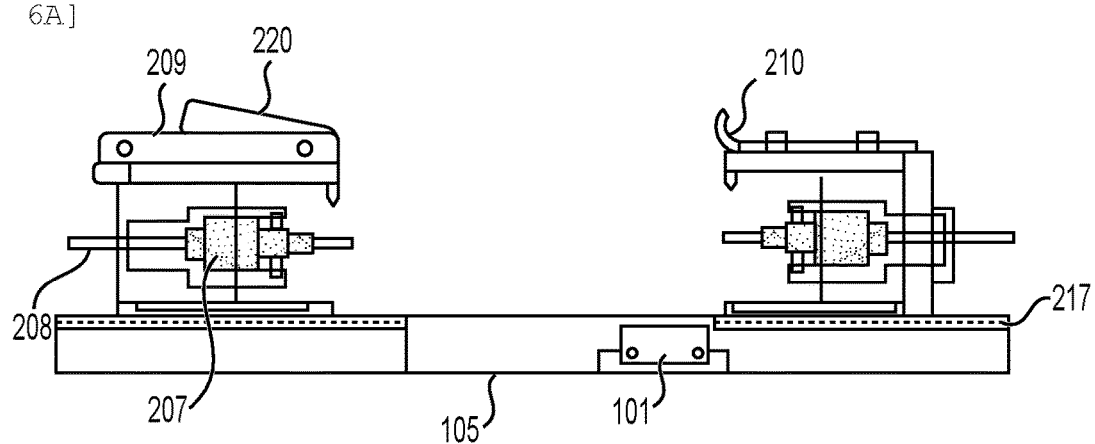
[FIG. 6B]
2) INSTALLATION OF COLUMN CARTRIDGE
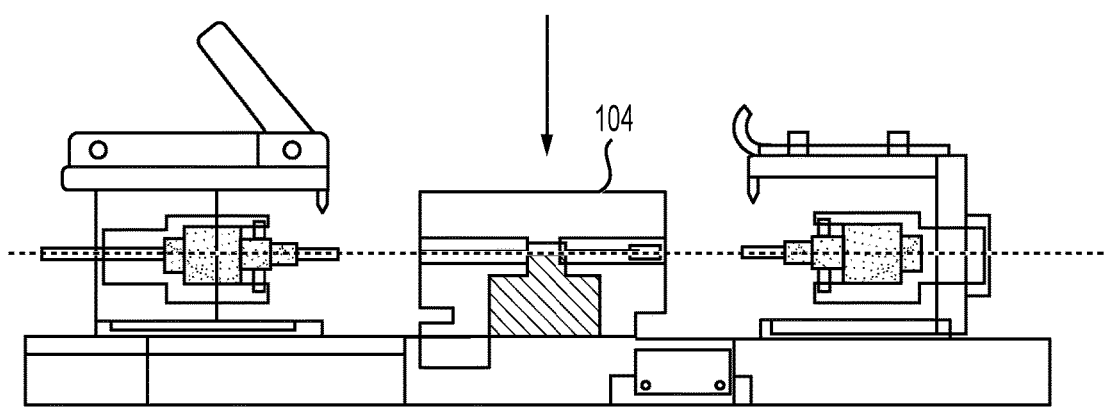

[FIG. 6C]
3) PRESS
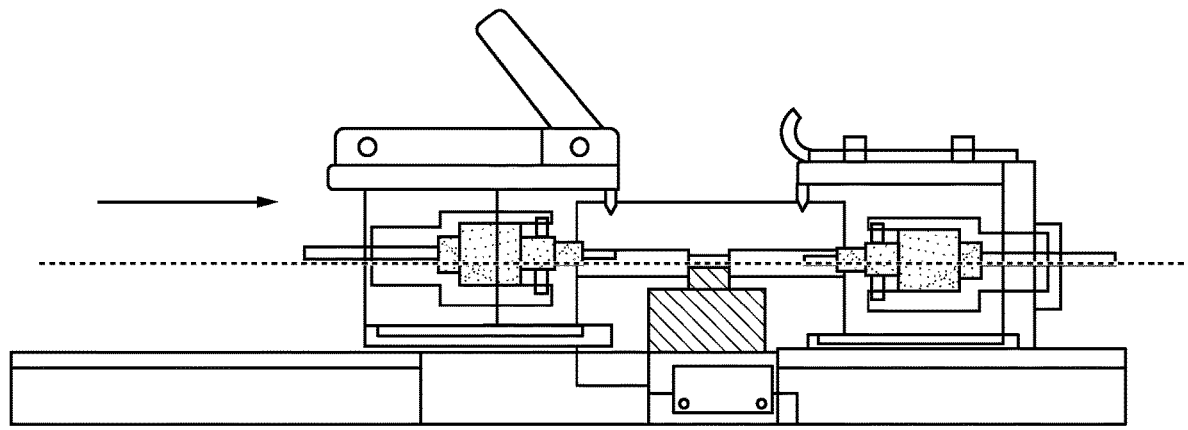
[FIG. 6D]
4) FASTENER HOOK
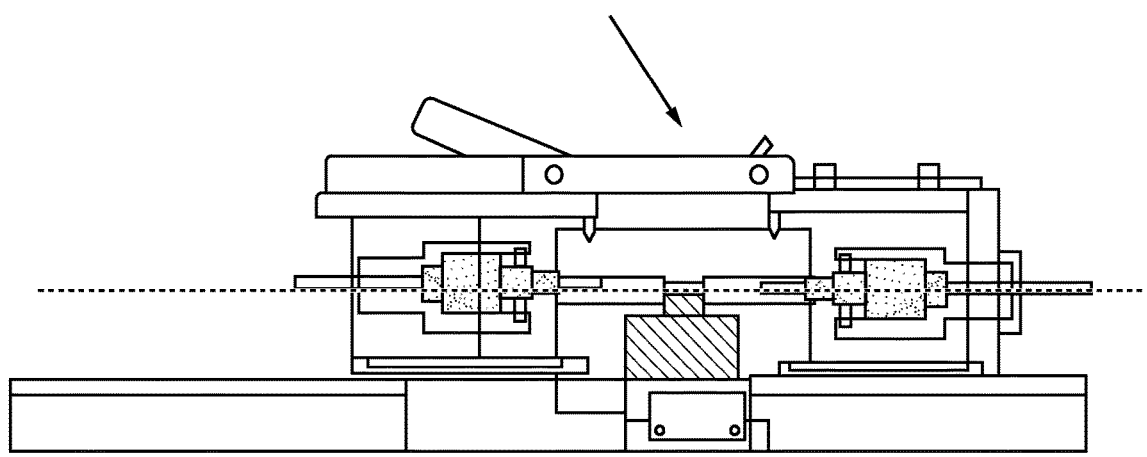

[FIG. 6E]
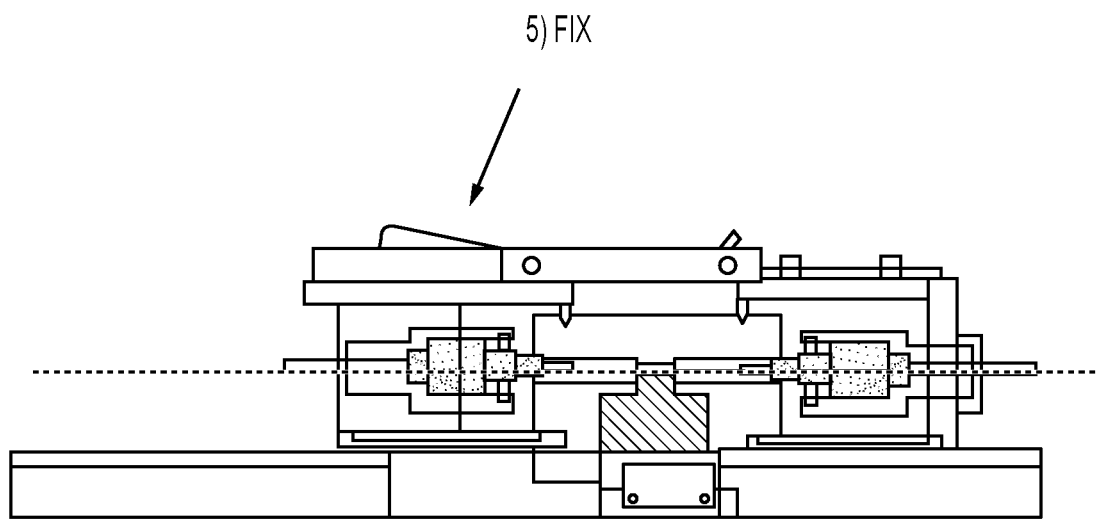

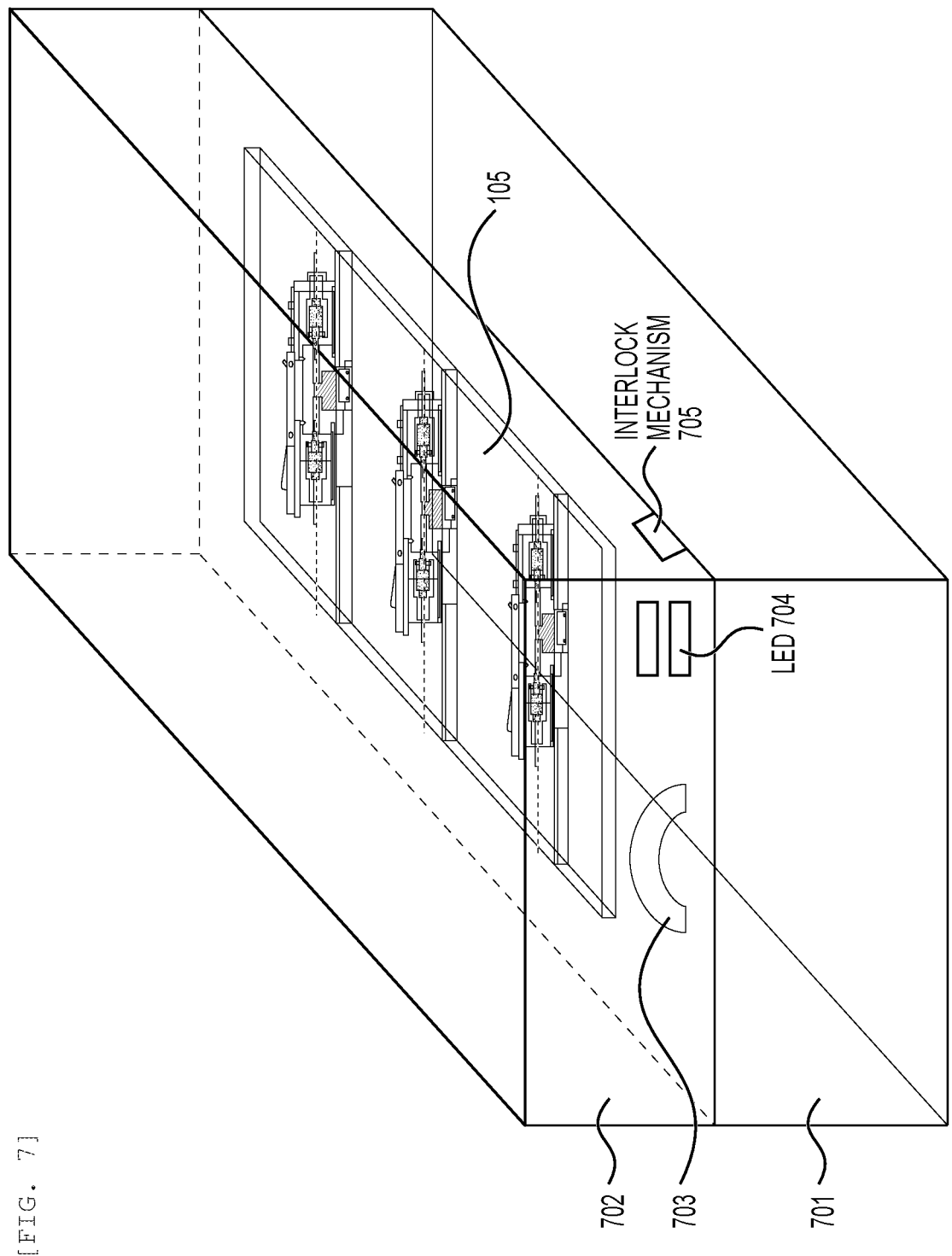
[FIG. 7]

[FIG. 8]
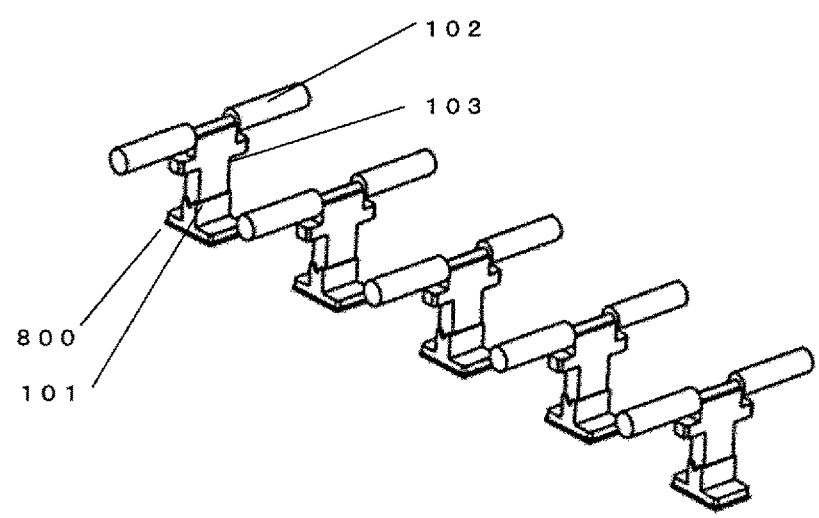

[FIG. 9A]
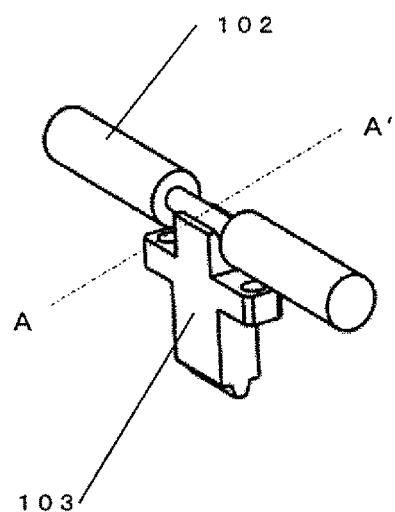

[FIG. 9B]
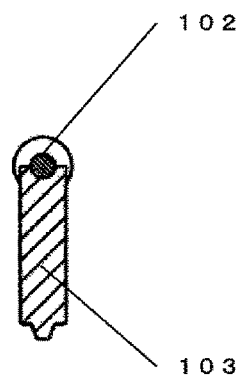

[FIG. 10A]
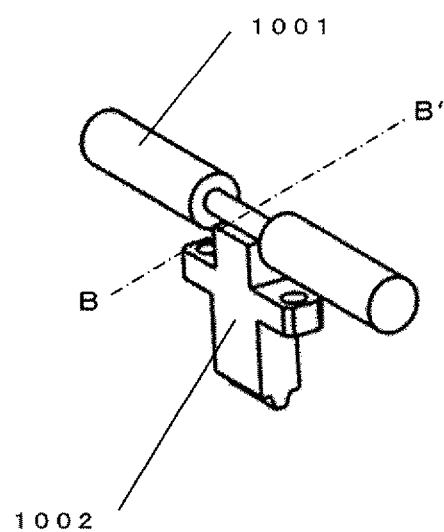

[FIG. 10B]
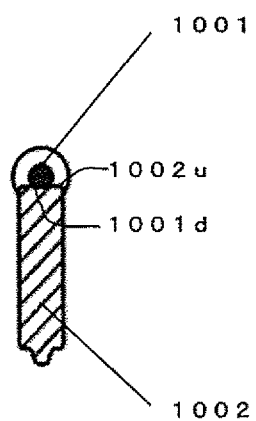

ANALYSIS APPARATUS COLUMN OVEN

TECHNICAL FIELD

The present invention relates to an analysis apparatus column oven that analyzes a sample.

BACKGROUND ART

One analysis method using an analysis column is chromatography. The analysis column (also simply referred to as "column") is obtained by filling a thin cylindrical container at a high pressure with a filler of particles that bind various functional groups to a base material such as silica gel or polymer gel.

The chromatography is a method of distributing various materials at a certain ratio due to a difference in affinity (interaction) between a stationary phase and a mobile phase that carries the materials through the stationary phase and separating the materials using a difference in ratio between the materials.

In high performance liquid chromatography, liquid is used as the mobile phase. In general, in order to obtain a result with a good peak shape by high performance liquid chromatography, it is necessary to control the temperature of the column to an optimum temperature. As the temperature of the mobile phase in the column increases, the viscosity of the mobile phase decreases such that the pressure decreases.

Therefore, diffusion of a sample in a pipe and the column is suppressed and the holding time is reduced such that a result with a good peak shape can be obtained. To that end, the column of the high performance liquid chromatography needs to be held in a column oven cavity to control the temperature of the column.

In a general temperature control method of the column, a heat source is provided on the outer side of a flow path pipe that delivers a mobile phase on a front stage of a column, and the temperature of the column is controlled by a pre-heating mechanism for controlling the temperature of the mobile phase and a mechanism for air-conditioning the inside of the column oven.

PTL 1 discloses a column module that houses a plurality of thermally conductive grooves and has a structure in which each of the grooves resides in a separate thermal zone to be thermally conditioned individually by one of the individually controlled thermoelectric chips and is adapted to hold one or more columns therein. In PTL 1, when each of the grooves resides in a separate thermal zone to hold a plurality of columns, the temperatures of the plurality of columns are controlled by one thermoelectric chip.

PTL 2 discloses a column cartridge in which at least a first column and a second column are mounted on a housing and an external pipe can be connected to each of the columns. In addition, an identifiable barcode or an RFID TAG is mounted on each cartridge to provide a function capable of managing data such as the temperature in the cartridge, the liquid-delivery pressure, or the liquid-delivery flow rate. In PTL 2, at least first and second columns are mounted on one cartridge. Therefore, the column cartridge is handled per at least two columns.

CITATION LIST

Patent Literature

PTL 1: JP-B-6194310
PTL 2: WO-A-2012/058515

SUMMARY OF INVENTION

Technical Problem

In the technique described in PTL 1, in order to control the temperatures of the plurality of columns, the temperatures of a plurality of thermally conductive grooves are controlled by one thermoelectric chip in one thermal zone, and the temperatures of the plurality of columns are controlled by the mechanism for air-conditioning the inside of the column oven. The temperatures of the plurality of columns are controlled by air-conditioning from one thermoelectric chip. The temperatures of the plurality of columns are not uniform, and the temperature control may vary depending on the columns.

In the technique described in PTL 2, in order to control the temperatures of a plurality of columns, the temperature in the column cartridge is controlled, the column cartridge having a structure where a plurality of columns are mounted on the housing and an external pipe can be connected to each of the columns. In this case, when one column in the cartridge deteriorates in performance or is clogged, it is necessary to exchange the cartridge in order to exchange the column, and a column that is still usable may be unnecessarily disposed. This unnecessity is against resource saving and cost reduction. In addition, an identifiable barcode or an RFID TAG is mounted for each cartridge. Therefore, the columns cannot be managed one by one.

An object of the present invention is to implement an analysis apparatus column oven equipped with a plurality of columns, which is capable of efficiently performing heat conduction on column basis, recognizing a column cartridge that holds a column, and being easily exchanged on column basis.

Solution to Problem

In order to achieve the objects, the invention is configured as follows.

An analysis apparatus column oven that includes an analysis column and a heat source that transfers heat to the analysis column, the analysis apparatus column oven including: a column cartridge having the analysis column; and a column change mechanism capable of attaching and removing the column cartridge, in which the heat source controls temperature of the analysis column of the column cartridge in a state where the column cartridge is attached to the column change mechanism.

Advantageous Effects of Invention

According to the present invention, it is possible to implement an analysis apparatus column oven equipped with a plurality of columns, which is capable of efficiently performing heat conduction on column basis, recognizing a column cartridge that holds a column, and being easily exchanged on column basis.

BRIEF DESCRIPTION OF DRAWINGS

FIG. 1 is a structural explanatory diagram of a column oven (column temperature control unit) 100 according to a first embodiment.
FIG. 2 is an explanatory diagram of a column change mechanism.
FIG. 3 is an explanatory diagram of a column heat block structure.

FIG. 4A is a top schematic perspective view of a column cartridge.

FIG. 4B is a lower schematic perspective view of the column cartridge.

FIG. 4C is a schematic cross-sectional view of the column cartridge.

FIG. 5 is a schematic configuration diagram of a movable ferrule mechanism.

FIG. 6A is an explanatory diagram of a column exchange operation procedure.

FIG. 6B is an explanatory diagram of the column exchange operation procedure.

FIG. 6C is an explanatory diagram of the column exchange operation procedure.

FIG. 6D is an explanatory diagram of the column exchange operation procedure.

FIG. 6E is an explanatory diagram of the column exchange operation procedure.

FIG. 7 is a schematic perspective view of a column housing.

FIG. 8 is an explanatory diagram of a column heat block according to a second embodiment.

FIG. 9A is an explanatory diagram of a column and a heat block according to the first embodiment.

FIG. 9B is an explanatory diagram of the column and the heat block according to the first embodiment.

FIG. 10A is an explanatory diagram of a column and a heat block according to a third embodiment.

FIG. 10B is an explanatory diagram of the column and the heat block according to the third embodiment.

DESCRIPTION OF EMBODIMENTS

Hereinafter, an embodiment of the invention will be described in detail with reference to the accompanying drawings.

A main target of the embodiment of the present invention is high performance liquid chromatography (HPLC), but the present invention is applicable to general analysis apparatuses. The present invention is also applicable to, for example, gas chromatography, ultra high performance liquid chromatography, or a clinical testing machine including HPLC/MS and a column separation unit.

A general HPLC includes a liquid delivery pump, an injector, an analysis column, a column oven that controls the temperature of the analysis column, and a pipe that connects the liquid delivery pump, the injector, and the analysis column to each other.

An overall configuration of the apparatus according to the present invention is a multi-HPLC apparatus in which a plurality of HPLC flow paths are coupled to one detector through a stream select valve that switches between the HPLC flow paths such that analyses of the HPLC streams can be performed. The HPLC flow paths have the same configuration and are arranged in parallel. By adjusting time of an analysis column equilibration step, an elution step, a washing step, and an injector washing step, the target component is introduced constantly from each of the HPLC streams to the detector such that there is no waiting time in the detector.

The present invention relates to a column oven that can hold a plurality of analysis columns.

Embodiment

First Embodiment

Hereinafter, a first embodiment of the present invention will be described in detail using FIGS. 1 to 7.

FIG. 1 is a structural explanatory diagram of a column oven (column temperature control unit) 100 according to the first embodiment. In FIG. 1, the column temperature control unit 100 includes a heat block 101, a column 102, a column heat block 103, a column cartridge 104, a column change mechanism 105 (including a fixed portion 105A and a movable portion 105B), a column cartridge heat insulating member 106, a heat source unit 107, a temperature sensor 108, a thermal protector 109, a control unit 110, a fan 111, and a heat sink 112. The column heat block 103 is arranged in an opening portion formed in the column cartridge 104 and is in contact with the heat block 101. That is, the heat block 101 is in contact with the column 102 through the column heat block 103 that is arranged in the opening portion formed in the column cartridge 104.

The heat block 101 includes a plurality of protrusion structures. In addition, as a material of the heat block 101, aluminum is used in the first embodiment of the present invention. However, copper, iron, stainless steel, or titanium may be used. In addition, the heat block 101 may be integrally formed of the same material or may be obtained by connecting portions formed of different materials.

The column 102 is obtained by filling a thin cylindrical container at a high pressure with particles of a filler that binds various functional groups to a surface of a base material such as silica gel or polymer gel. The column is separated by being eluted at a specific holding time by adsorption and desorption due to an interaction between the functional group and a measurement target material. In the first embodiment, silica gel is used as the base material, and an ODS column (0.5 mm ID×50 mm L, particle diameter: 2.6 µL) having a reversed-phase chromatography mode is used as the functional group.

The separation mode of the column 102 may be another mode, for example, a normal-phase chromatography mode, an HILIC chromatography mode, an ion exchange chromatography mode, a gel permeation chromatography mode, an affinity chromatography mode, or an immunoaffinity chromatography mode. In addition, the embodiment is also applicable to a column for gas chromatography.

The column cartridge 104 is formed of a PPEX resin, has a rectangular parallelepiped shape having a length of 75 mm, a width of 20 mm, a height of 34 mm, and includes the column heat block 103 and the column 102. As the column 102 according to the first embodiment, a column having a size of 0.5 mm ID×50 mm L is used. By changing the internal shape of the column cartridge 104, columns having an inner diameter of 0.3 to 1.0 mm ID and a length of 10 to 70 mm L can be housed.

As the column heat block 103, blocks having the same shape can be used.

The column cartridge 104 has a notch structure (opening portion) where a recess structure is provided in at least a portion, and is structured to be capable of coming into contact with the protrusion structure of the heat block 101. As a result, the temperature of the column 102 is controlled by the column 102 coming into contact with the column heat block 103. The heat block 101 may come into direct contact with the column 102. In this case, it is desirable that the contact portion of the protrusion structure of the heat block 101 is a curved structure such that the contact area with the cylindrical column 102 increases.

The column cartridge 104 and the column heat block 103 are separated from each other by the heat insulating member 106 formed of an EPT sealer in the first embodiment. The heat insulating member 106 may be glass wool or nylon.

The temperature control of the column 102 will be described. A heater (not shown (driven at 10 W and DC 24V on column basis)) as the heat source unit 107 and a thermistor (not shown) as the temperature sensor 108 are connected to the heat block 101 through the control unit 110. By controlling the temperature of the heat block 101 from 40° C. to 70° C. by feedback control using a PID control method, the temperature of the column 102 is controlled from 40° C. to 70° C. through the heat block 101 and the column heat block 103.

In the first embodiment, the heater is used as the heat source unit 107. However, a Peltier element may be used. In the first embodiment, the PID method is used as the feedback control. However, ON/OFF control or PI control may be used. In the first embodiment, the thermistor is used as the temperature sensor 108. However, a thermocouple or a platinum side thermal resistor may be used. Likewise, in the first embodiment, in a connection portion of the temperature sensor 108, the temperature of the heat block 101 is measured for feedback. However, the temperature of any one of the heat block 101, the column heat block 103, and the column 102 may be measured.

In this case, when a plurality of columns 102 are mounted on a plurality of column ovens 100, the temperature of any one of the protrusion portion of the heat block 101, the column heat block 103, and the column 102 is measured for feedback. Therefore, the control unit 110 is complicated. The temperature accuracy of the temperature of the column 102 can be controlled within ±1° C. The thermal protector 109 is connected to the heat source unit 107, and when the temperature of the column 102 reaches 90° C. as a set temperature, the heater is turned off such that the temperature control is stopped.

When the column 102 is cooled, the fan 112 having a size of 80 mm×80 mm and a thickness of 25 mm that is connected to the control unit 110 is turned on such that the heat block 101 starts to be cooled. In order to increase the cooling efficiency, the heat block 101 may include the heat sink 112 formed of aluminum or copper.

The column cartridge 104 is separated from the column heat block 103 by the heat insulating member 106. Therefore, even when the temperature of the column heat block 103 reaches 70° C., the surface temperature of the cartridge 104 does not reach 70° C.

As described above, the column change mechanism 105 shown on the left side of FIG. 1 is the movable portion 105B and is movable in the left-right direction in FIG. 1. The column cartridge 104 can be fixed between the fixed portion 105A and the movable portion 105B of the column change mechanism 105 on the left and right sides. When the column cartridge 104 fixed to the column change mechanism 105 is released from the column change mechanism 105, the movable portion 105B on the left side moves in the left direction of FIG. 1 such that fixing by the column change mechanism 105 is released. As a result, the column cartridge 104 can be easily released from the column change mechanism 105, and the column cartridge 104 can be easily attached to and detached from the column change mechanism 105. When the column cartridge 104 is attached to the column change mechanism 105, heat is transferred from the heat block 101 to the column 102 directly or through the column heat block 103 such that the temperature of the column 102 can be controlled.

Next, the column change mechanism 105 will be described using FIGS. 2 and 3. FIGS. 2 and 3 are explanatory diagrams of the column change mechanism 105. In FIG. 2, the column change mechanism 105 includes a ferrule 206, a movable ferrule connector 207, a pipe 208, a fastener pull 209, a fastener fitting 210, a column cartridge presser 211, a slide guide 212, a RFID reader 214, a fixed wall 215, a column changer heat insulating member 216, a fixed bottom plate 217, a receiver 218, and a fixed fitting 219. The pipe 208 is supported by the movable connector ferrule 207.

In addition, the fixed bottom plate 217 supports the ferrule 206, the movable ferrule connector 207, the pipe 208, the fastener pull 209, the fastener fitting 210, the column cartridge presser 211, the slide guide 212, the RFID reader 214, the fixed wall 215, the column changer heat insulating member 216, the receiver 218, and the fixed fitting 219.

A sample or the like is delivered from the pipe 208 to the column 102 through the column change mechanism 105. In addition, the sample or the like is delivered from the column 102 to the pipe 208 of the column change mechanism 105.

The temperature of the heat block 101 is controlled to the set temperature, a plurality of column cartridges 104 can be provided in the heat block 101, and the heat block 101 comes into contact with the column heat block 103 in the column cartridge 104 such that the temperature in the column cartridge 104 is controlled. For example, a case where five column cartridges 104 are provided in the heat block 101 will be described using FIG. 3.

In FIG. 3, the heat block 101 includes a base plate 303 and an aluminum block 302. The materials of the base plate 303 and the aluminum block 302 are aluminum, the size of the base plate 303 is 350 mm×30 mm×4 mm, the size of aluminum block 302 is 20 mm×14 mm×10 mm, and the aluminum blocks 302 are regularly disposed on the base plate 303 at pitch intervals of 50 mm. During the temperature control, the aluminum block 302 comes into contact with the column heat block 104, the column heat block 104 comes into contact with the column 102. A sheet heater 300 is formed in a sheet shape where a plurality of column cartridges 104 can be disposed.

Therefore, heat is transferred to a plurality of columns 102 from the heat block 101 heated by the sheet heater 300 (corresponding to the heat source 107) as a heat source such that the temperature control can be performed. In the first embodiment, the sheet heater 300 is used. Of course, however, a rubber heater, a ceramic heater, or a cartridge heater may be used. In addition, the aluminum block 302 may be copper or iron. Although not shown in the drawing, a pre-heating type where the temperature of the pipe 208 connected to the column 102 is controlled by the heat source may be used in combination. In this case, immediately before being connected to the column 102, the temperature of the pipe 208 is controlled to be the same as the temperature of the column by the heat source such as the sheet heater, and an HPLC solution that is delivered to the pipe is delivered to the column 102. As a result, a difference in temperature between the HPLC solution delivered to the column 102 and the column 102 is reduced, and the reproducibility of column separation is improved.

The column cartridge 104 will be described using FIGS. 4A, 4B, and 4C. FIG. 4A is a top schematic perspective view of the column cartridge 104, FIG. 4B is a lower schematic perspective view of the column cartridge 104, and FIG. 4C is a schematic cross-sectional view of the column cartridge 104.

In FIGS. 4A, 4B, and 4C, the column cartridge 104 includes a column cartridge upper portion 401, a column cartridge lower portion 402, the column 102, the column cartridge heat insulating member 106 that thermally insulates the column, the column heat block 103, and a screw 406.

The column cartridge upper portion 401 that is formed of a PEEK resin and has a rectangular parallelepiped shape having a length of 75 mm, a width of 20 mm, a height of 10 mm and the column cartridge lower portion 402 that is formed of a PEEK resin and has a rectangular parallelepiped shape having a length of 75 mm, a width of 20 mm, a height of 24 mm are formed of PEEK from the viewpoint of suppressing an increase in the surface temperature of the column 102 in consideration of the safety of a user such as burn during column exchange. The column cartridge upper portion 401 and the column cartridge lower portion 402 are fixed through the screw 406 such that the column 102 is vertically interposed therebetween.

Of course, the material of the column cartridge 104 may be a thermally insulating PPS resin. The column cartridge upper portion 401 and the column cartridge lower portion 402 have a structure of vertically pressing the column 102 but may have a structure of laterally pressing the column 102.

The column cartridge heat insulating member 106 is formed of an EPT sealer as a material and is disposed to cover the column that is not in contact with the column heat block 103 to prevent heat radiation. The material of the cartridge heat insulating member 106 may be glass wool or nylon. The column 102 interposed between the column cartridge upper portion 401 and the column cartridge lower portion 402 has a structure where both ends are positioned 5 mm or more inward from the connection portion of the column cartridge 104, and has a structure where the user does not touch a tip of the column 102 that is likely to be a high-temperature portion in consideration of the safety of the user such as burn during column exchange.

As shown in FIG. 4C, the column heat block 103 has a structure in which the upper portion is recessed in a cylindrical shape to be capable of housing the cylindrical column 102 and the rectangular parallelepiped in the lower portion protrudes from the center portion of the bottom surface to come into contact with the heat block (aluminum block) 302. Heating surfaces of the rectangular parallelepiped and the heat block (aluminum block) 302 may be connected in a planar shape. However, in order to improve the heat conduction efficiency, a stepped level difference may be provided to increase the surface area of the heating surface. In addition, the structure of the heating surface does not need to be a rectangular parallelepiped and may be a cylindrical shape or a coil shape.

As shown in FIG. 4B, the bottom surface of the column cartridge lower portion 402 has an opening portion where the column heat block 103 is disposed, and is structured to surround the column heat block 103, and the bottom surface (in FIG. 4B, the upper surface) of the column cartridge lower portion 402 is structured to be at least 12 mm longer than the bottom surface (in FIG. 4B, the upper surface) of the column heat block 103 in a direction of the bottom portion (in FIG. 4B, the upper portion). That is, the surface of the column heat block 103 opposite to the surface in contact with the column 102 is at least 12 mm smaller than the bottom surface of the column cartridge lower portion 402. In other words, the bottom surface of the column cartridge lower portion 402 protrudes from the bottom surface of the column heat block 103 by at least 12 mm.

The bottom surface of the column cartridge lower portion 402 has a structure where the user does not touch the bottom surface of the column heat block 103 that is likely to be a high-temperature portion in consideration of the safety of the user such as burn during column exchange.

The bottom portion of the column cartridge lower portion 402 has a structure where one side has a notch and the other side does not have a notch, and is structured to be capable of being inserted only in one direction into the contactable heat block (aluminum base) 302 from an upper space of the fixed bottom plate 217 of the column change mechanism 105. As a result, during column exchange, the installation direction of the column cartridge 104 is only one. Therefore, an entrance (IN) direction and an exit (OUT) direction of the column 102 can be provided at appropriate positions.

The fixed bottom plate 217 includes the slide guide 212 (shown in FIG. 2) and can be slid when the column cartridge 104 is provided during exchange of the column 102. In addition, by providing a structure of the bottom portion of the column cartridge lower portion 402 where the length relative to the width varies depending on the type of the column 102, the column 102 can be appropriately provided.

Regarding a structure of a joined portion of the column cartridge lower portion 402 and the slide guide 212, not only by adopting the structure where the length relative to the width has the specific value but also by providing a circular or elliptical structure depending on the type of the column 102, the type of the column 102 can be identified by fitting.

The heat block (aluminum block) 302 is structured to be positioned at least 12 mm below (downward) the upper surface of the fixed bottom surface 217. The heat block (aluminum block) 302 has a structure where the user does not touch the bottom surface of the column heat block 103 that is likely to be a high-temperature portion in consideration of the safety of the user such as burn during column exchange.

An RFID tag 411 is provided on a side surface of the column cartridge 104 such that a status such as the type or manufacturing number of the column 102 can be checked by being read with the RFID reader 214 during column exchange. By counting the number of use using the control unit (control PC) 110, the column exchange period can be notified to a display unit or the like of the control unit 110. During the exchange of the column 102, the record "used" is written into the column 102 to be exchanged to prevent reuse.

Next, the movable ferrule connector 207 will be described using FIG. 5. FIG. 5 is a diagram showing a state where the movable ferrule connector 207 is pressed most against the column cartridge 104.

In FIG. 5, the movable ferrule connector 207 includes the ferrule 206, a movable connector housing 502, a pipe presser 503, an inner member 504, an outer member 505, a stop wheel 506, a plate spring 507, a spring washer 508, a stopper 509, and the pipe 208. The movable ferrule connector housing 502 has a cylindrical shape, in which cylindrical spaces having different four-stage inner diameters are provided from the central axis. In the cylindrical space having the smallest inner diameter on the inside of the movable ferrule connector housing 502, the pipe 208 is disposed and is pressed with the pipe presser 503.

In the cylindrical space having the second smallest inner diameter on the inside of the movable ferrule connector housing 502, the plate spring 507 is disposed and is compressed to generate a pressing force during the fixing of the column 102. In the cylindrical space having the third smallest inner diameter on the inside of the movable ferrule connector housing 502, the spring washer 508 is disposed, and the inner member 504 is disposed in contact with the spring washer 508 to press the pipe presser 503. The outer member 505 is disposed to press the inner member 504. In the cylindrical space having the largest inner diameter on the inside of the movable ferrule connector housing 502, the stopper 509 is disposed such that the outer member 505 comes into contact with the stopper 509 to stop the movement of the outer member 505 in a state where it is pressed most during the fixing of the column 102. As a result, the outer member 505 is pressed from a predetermined position, and damages to the respective members are prevented.

On the column 102 side in the cylindrical space having the largest inner diameter on the inside of the movable ferrule connector housing 502, the stop wheel 506 is disposed such that the outer member 505 comes into contact with the stop wheel 506 to stop the movement of the outer member 505 in a state where it is not pressed during the exchange of the column 102. As a result, the outer member 505 is prevented from flying out from the movable ferrule connector housing 502.

The ferrule 206 is disposed at a tip of the outer member 505. The spaces are provided such that the center portions of the pipe presser 503, the inner member 504, and the outer member 505 pass through the pipe 208, and the pipe 208 is fixed by being fastened by the pipe presser 503. In addition, the ferrule 206 is fixed to the pipe 208 by being fastened, and the amount of the pipe 208 protruding from the ferrule 206 is also determined.

A connection portion of the column 102 has a tapered structure and can be sealed by adhesion between the tip of the pipe 208 and the tip of the tapered structure and adhesion between the ferrule 206 and the tapered structure during the fixing of the column 102. The movable ferrule connector 207 on the exit (OUT) side of the column 102 is provided to be bilaterally symmetrical, and the movable connector housing 502 on this side is fixed to the fixed wall 215 using the fixed fitting 219 (refer to FIG. 2). The fixed wall 215 is connected to the fixed bottom plate 217, the column changer heat insulating member 216 is disposed below the fixed bottom plate 217 to separate the heat block 101 and the fixed bottom plate 217 from each other, and heat conduction from the heat block 101 to the fixed bottom plate 217, the fixed wall 215, and the movable ferrule connector 207 is suppressed.

The column exchange operation procedure in the column change mechanism 105 will be described using FIGS. 6A, 6B, 6C, 6D, and 6E.

A method of providing the column cartridge 204 includes 1) an initial state (FIG. 6A), 2) a step of providing the column cartridge 104 (FIG. 6B), 3) a step of pressing the column cartridge 104 (FIG. 6C), 4) a fastener hooking step (FIG. 6D), and 5) a fixing step (FIG. 6E).

As shown in FIG. 6A, in 1) the initial state, the column cartridge 104 is not provided in the column change mechanism 105. In 2) the step of providing the column cartridge 104, the column cartridge 104 is inserted in one direction into the contactable heat block 101 from the upper space of the fixed bottom plate 217.

Next, in 3) the step of pressing the column cartridge 104, while a fixed lever 220 of the fastener pull 209 of the movable portion 105B is rotated by a worker to release the fixing of the fastener pull 209, the movable portion 105B is moved from the left direction to the right direction in FIG. 6C along the slide guide 212 where the movable ferrule connector 207 is provided in the fixed bottom plate 217, and the column cartridge 104 moves in the right direction to be pressed against the fixed portion 105A on the right side. By converting the rotational movement of the fixed lever 220 of the fastener pull 209 into an equilibrium movement, the movable ferrule connector 207 and the column cartridge 104 are pressed against the fixed portion 105A on the right side.

In 4) the fastener hooking step, the fastener pull 209 of the movable portion 105B on the right side is rotated to and hooked with the fastener fitting 210 of the fixed portion 105A on the left side. 3) The step of pressing the column cartridge 104 and 4) the fastener hooking step can be performed as a series of operations.

Next, by pressing the fixed lever 220 to fix the fastener pull 209 in 5) the fixing step, the column 104 is fixed to the column change mechanism 105. In the column change mechanism 105, by using the sealing method by the structure of the movable ferrule connector 207, the pressure resistance can be maintained even when the mobile phase is delivered to the pipe 208 at a high flow rate.

The column 102 can be detached by performing 1) the initial state, 2) the step of providing the column cartridge 104, 3) the step of pressing the column cartridge 104, 4) the fastener hooking step, and 5) the fixing step in the reverse order.

That is, the fixed lever 220 is rotated in the right direction in FIG. 6E to release the fixing of the fastener pull 209, and the fastener pull 209 is released from the fastener fitting 210, is rotated in the left direction in FIG. 6D, and returns to the movable portion 105B on the left side to enter the state in FIG. 6C. The movable portion 105B on the left side is slid (moved) in the left direction in FIG. 6C to move away from (direction away from) the column cartridge 104, and the column cartridge 104 fixed to the fixed portion 105A and the movable portion 105B on the left and right sides is released. As a result, the released column cartridge 104 can be easily taken out.

In the first embodiment, when the mobile phase is delivered at 250 μL/min, a pressure of about 100 MPa is applied to the column 102. In this case, the mobile phase does not leak from the connection portion between the movable ferrule connector 207 and the column 102, and the pressure resistance is maintained.

A safety mechanism of the column oven 100 will be described using FIG. 7.

In FIG. 7, in a column oven housing 701, the column change mechanism 105 is mounted, and a column oven cover 702 is provided in order to maintain the temperature control in the column oven cavity. In an outer wall of the column oven cover 702, a handle 703 is provided, and the column oven cover 702 can be opened and closed in a direction from the front to the depth. In the column oven cavity, an interlock mechanism 705 equipped with a temperature sensor is provided, and when the temperature of the column is higher than or equal to 40° C. as a set temperature, the column oven cover 702 cannot be opened and closed. Whether or not the column oven cover 702 can be opened and closed can be checked by visual inspection through a LED 704 lighting provided in the outer wall of the column oven cover 702.

With the column oven 100 according to the first embodiment of the present invention, even when a plurality of columns 102 are mounted on the column oven 100, efficient heat conduction can be implemented on column 102 basis, and the set temperature and time can be managed on column 102 basis by mounting the identifiable mechanism on column cartridge 104 basis.

That is, it is possible to implement an analysis apparatus column oven 100 equipped with a plurality of columns 102, which is capable of efficiently performing heat conduction on column 102 basis, recognizing the column cartridge 104 that holds the column 102, and being easily exchanged on column 102 basis.

Second Embodiment

Next, a second embodiment of the present invention will be described.

In the second embodiment, as shown in FIG. 8, a sheet heater 800 as a heat source is configured on column 102 basis. A difference between the first embodiment and the second embodiment is as follows. In the first embodiment, as shown in FIG. 3, the temperatures of a plurality of columns 102 can be collectively controlled by providing the sheet heater 300 as the heating portion in the base plate 303. In the second embodiment, a plurality of sheet heaters 800 are provided in the respective columns 102.

The other configurations are the same in the first embodiment and the second embodiment.

In the second embodiment, as in the first embodiment, during the temperature control, the heat block 101 comes into contact with the column heat block 103, the column heat block 103 comes into contact with the column 102. Therefore, heat is transferred to the columns 102 from the heat block 101 heated by the sheet heater 800 as a heat source such that the temperature control can be performed.

In the second embodiment of the present invention, the temperature control by heat conduction is performed instead of the temperature control by air-conditioning. Therefore, different temperatures can be set depending on the columns 102.

In the second embodiment, the connection portion of the temperature sensor is the heat block 101, and feedback control can be performed by measuring the temperature of the heat block 101. However, the temperature sensor may be disposed to measure the temperature of any one of the heat block 101, the column heat block 103, and the column 102. The temperature accuracy of the temperature of the column 102 can be controlled within ±1° C.

According to the second embodiment, the same effects as those of the first embodiment can be obtained, and the optimum temperature can be set for each of the plurality of columns 102.

In the first embodiment and the second embodiment, as shown in FIG. 9A and FIG. 9B showing a cross-section taken along line A-A' of FIG. 9A, the cylindrical column 102 comes into contact with the above-described curved surface of the column heat block 103 where the curved groove having substantially the same diameter as the column 102 is provided on the upper surface, and the column 102 is heated by heat conduction.

A contact surface between the column 102 and the column heat block 103 may have a shape other than the above-described shapes.

Third Embodiment

Next, a third embodiment will be described. The third embodiment is an example where the contact surface between the column 102 and the column heat block 103 has a shape different from those of the first embodiment and the second embodiment shown in FIGS. 9A and 9B. The other configurations of the third embodiment are the same as those of the first embodiment or the second embodiment.

FIGS. 10A to 10B are diagrams showing a column 1001 and a column heat block 1002 according to the third embodiment. FIG. 10B is a cross-sectional view taken along line B-B' of FIG. 10A.

As shown in FIGS. 10A and 10B, a bottom portion 1001d of the column 1001 is processed in a planar shape, and comes into flush contact with a connection portion 1002u of the column heat block 1002 where the planar connection portion 1002u is provided on the upper surface.

Since a column bottom portion 1001d and the connection portion 1002u are planar, the processing accuracy can be improved, contact resistance of heat conduction can be further reduced, and the column 1001 can be efficiently heated.

The heat block 101, the column heat block 103, and the heat source unit 107 can be collectively referred to as the heat source.

REFERENCE SIGNS LIST 100 column oven (column temperature control unit)
101 heat block
102 column
103 column heat block
104 column cartridge
105 column change mechanism
105A fixed portion
105B movable portion
106 column cartridge heat insulating member
107 heat source unit
108 temperature sensor
109 thermal protector
110 control unit
111 fan
112 heat sink
206 ferrule
207 movable ferrule connector
208 pipe
209 fastener pull
210 fastener fitting
211 column cartridge presser
212 slide guide
214 RFID reader
215 fixed wall
216 column changer heat insulating member
217 fixed bottom plate
218 receiver
219 fixed fitting
220 fixed lever
300, 800 sheet heater
302 aluminum block
303 base plate
401 column cartridge upper portion
402 column cartridge lower portion
406 screw
411 RFID tag
502 movable connector housing
503 pipe presser
504 inner member
505 outer member
506 stop wheel
507 plate spring
508 spring washer
509 stopper
701 column oven housing
702 column oven cover
703 handle
704 LED
705 interlock mechanism
1001 column
1001d column bottom portion
1002 column heat block
1002u connection portion

The invention claimed is:

1. An analysis apparatus column oven that includes an analysis column and a heat source that transfers heat to the analysis column, the analysis apparatus column oven comprising:
   a heat block transferring heat from the heat source to the analysis column;
   a column cartridge including the analysis column and a column heat block that contacts the analysis column and transfers heat transferred from the heat block to the analysis column; and
   a column change mechanism capable of attaching and removing the column cartridge, wherein
   the heat source controls temperature of the analysis column of the column cartridge in a state where the column cartridge is attached to the column change mechanism, and
   the heat source is a sheet heater in which a plurality of the column cartridges are arranged.

2. The analysis apparatus column oven according to claim 1, wherein
   the heat source includes a plurality of sheet heaters in which one column cartridge is arranged.

3. The analysis apparatus column oven according to claim 1, wherein
   the column cartridge includes an opening portion in which the column heat block is arranged, and a surface of the column heat block opposite to a surface in contact with the analysis column is at least 12 mm smaller than a bottom surface of the column cartridge.

4. The analysis apparatus column oven according to claim 1, wherein
   an upper surface of the column heat block has a curved groove having substantially the same diameter as that of the analysis column on the upper surface, and the analysis column is in contact with the curved groove of the column heat block and is heated by heat conduction.

5. The analysis apparatus column oven according to claim 1, wherein
   an upper surface of the column heat block includes a planar connection portion, the analysis column includes a planar bottom portion, and the planar bottom portion of the analysis column is in contact with the planar connection portion of the column heat block and is heated by heat conduction.

6. The analysis apparatus column oven according to claim 1, wherein
   the column change mechanism includes a fixed portion and a movable portion, the column cartridge is arranged between the fixed portion and the movable portion, the column cartridge is attached to the column change mechanism with the movable portion being moved and the column cartridge being pressed against the fixed portion, and the column cartridge is opened and removed from the column change mechanism with the movable portion being moved in a direction away from the column cartridge.

7. An analysis apparatus column oven that includes an analysis column and a heat source that transfers heat to the analysis column, the analysis apparatus column oven comprising:
   a heat block transferring heat from the heat source to the analysis column;
   a column cartridge including the analysis column and a column heat block that contacts the analysis column and transfers heat transferred from the heat block to the analysis column; and
   a column change mechanism capable of attaching and removing the column cartridge, wherein
   the heat source controls temperature of the analysis column of the column cartridge in a state where the column cartridge is attached to the column change mechanism, and
   the column change mechanism includes a pipe that liquid-delivers at least a sample to the analysis column, a movable connector ferrule that supports the pipe, and a fixed bottom plate that supports at least the movable connector ferrule, and in a state where the column cartridge is attached to the column change mechanism, an upper surface of the heat block is located at least 12 mm below an upper surface of the fixed bottom plate.

* * * * *